(12) United States Patent
Evans et al.

(10) Patent No.: US 7,011,512 B2
(45) Date of Patent: Mar. 14, 2006

(54) LASER RIDGE SKIN DISTORTION REDUCTION APPARATUS

(75) Inventors: Gregg Stoutenburg Evans, London (CA); Timothy D. Boxell, Southfield, MI (US)

(73) Assignee: W. Inoac, Inc., Southfield, MI (US)

( * ) Notice: Subject to any disclaimer, the term of this patent is extended or adjusted under 35 U.S.C. 154(b) by 108 days.

(21) Appl. No.: 10/134,408

(22) Filed: Apr. 29, 2002

(65) Prior Publication Data

US 2003/0012839 A1 Jan. 16, 2003

Related U.S. Application Data

(62) Division of application No. 09/532,561, filed on Mar. 22, 2000, now Pat. No. 6,379,604.

(51) Int. Cl.
*B26D 5/06* (2006.01)

(52) U.S. Cl. .................... 425/174.4; 264/482

(58) Field of Classification Search ............ 425/174.4; 264/482; 219/121.67, 121.68
See application file for complete search history.

(56) References Cited

U.S. PATENT DOCUMENTS

| | | | |
|---|---|---|---|
| 3,626,143 A | 12/1971 | Fry .......................... 219/121 |
| 3,909,582 A | 9/1975 | Bowen ................ 219/121 LM |
| 4,549,063 A | 10/1985 | Ang et al. ............. 219/121 LJ |
| 4,562,333 A | 12/1985 | Taub et al. ............ 219/121 LJ |
| 4,986,664 A | 1/1991 | Lovoi ......................... 356/376 |
| 5,335,935 A | 8/1994 | Proos et al. ............. 280/728 B |
| 5,632,914 A | 5/1997 | Hagenow et al. ....... 219/212.71 |
| 5,650,115 A | 7/1997 | Proos et al. ................ 264/400 |
| 5,729,411 A * | 3/1998 | Kishi et al. ................ 264/400 |
| 5,744,776 A | 4/1998 | Bauer ...................... 219/121.7 |
| 5,807,379 A * | 9/1998 | L'Esperance, Jr. ............. 606/5 |
| 5,817,271 A | 10/1998 | Congleton et al. .......... 264/400 |
| 5,883,356 A | 3/1999 | Bauer et al. ............ 219/121.62 |
| 5,961,143 A | 10/1999 | Hlywka et al. .......... 280/728.3 |
| 5,968,381 A | 10/1999 | Nusshor ................ 219/121.69 |
| 6,034,349 A * | 3/2000 | Ota ........................ 219/121.73 |
| 6,090,330 A * | 7/2000 | Gawa et al. ................ 264/400 |
| 6,113,835 A | 9/2000 | Kato et al. ................. 264/400 |
| 6,139,049 A | 10/2000 | Gallagher ................ 280/728.3 |
| 6,267,918 B1 | 7/2001 | Bauer ......................... 264/400 |
| 6,383,721 B1 * | 5/2002 | Kamimura et al. ......... 430/320 |
| 2002/0149136 A1 * | 10/2002 | Baird et al. ................. 264/400 |

* cited by examiner

*Primary Examiner*—Duane Smith
*Assistant Examiner*—Emmanuel S. Luk
(74) *Attorney, Agent, or Firm*—Dykema Gossett PLLC

(57) ABSTRACT

A method of forming an air bag release score line in a material by forming a ridge in the material along the line to be scored. By heat scoring the material along the ridge a ridge-induced twist prevents the formation of a witness line.

10 Claims, 2 Drawing Sheets

US 7,011,512 B2

LASER RIDGE SKIN DISTORTION REDUCTION APPARATUS

This application is a divisional application of U.S. application Ser. No. 09/532,561, filed Mar. 22, 2000, now U.S. Pat. No. 6,379,604.

TECHNICAL FIELD

The present invention relates generally to an apparatus for preweakening automotive trim covers to provide air bag deployment openings. More specifically, the present invention relates to the elimination of witness marks on trim pieces covering air bag deployment openings.

BACKGROUND OF THE INVENTION

Air bags are now universally used for the protection of occupants in motor vehicles. Most recently, the use of automotive air bags has expanded to include front and side air bags for both the driver and the front seat passenger. As with many automotive safety features, air bag deployment systems have both utilitarian and aesthetic functionalities which must be addressed. One such feature is deployment access.

As will be known by those skilled in the art, an air bag system has an inflatable cushion housed within a storage compartment, for example behind the instrument panel of the vehicle. The cushion is literally a bag having an inlet that is connected to a gas generator. Upon impact the gas generator rapidly fills the air bag with gas, such that the inflated bag extends outwardly from the storage compartment. The inflated bag then serves as a cushion to help absorb the forward inertial force of the vehicle occupant.

It will be understood by those skilled in the art that air bag enclosures must not impede the expansion of the air bag; that is, in order for the bag to provide protection it must deploy within milliseconds of the initial impact as detected by various vehicle sensors. Thus, no part of the air bag enclosure can be allowed to significantly resist the force of the expanding air bag. Accordingly, some air bag doors are manufactured as separate panels which fit within an opening in the instrument panels and may be hinged along one or several sides. Although they do not interfere with deployment, a line or channel is visible at the intersect of the air bag door and the surrounding instrument panel. In order to provide a more pleasing appearance, alternatives have been sought wherein the instrument panel trim material is an uninterrupted covering which extends over the air bag door substrate pieces; that is, no separate delineation of the air bag door is visible to the vehicle occupants.

One approach which has met with considerable success is the use of laser scoring. In laser scoring, the back of the instrument panel skin is scored to circumscribe the air bag deployment door. In more detail, in one such method a vacuum formed skin is held on a flat plate or fixture. A robotically controlled laser then etches the desired pattern in the skin. It is important that the depth and width of the pre-weakened score line formed by the laser be precisely controlled to ensure that the skin will properly separate or tear when the air bag deploys.

As will be appreciated by those skilled in the art, the instrument panel skin is a polymeric material, typically a thermoplastic which melts under the heat of the laser beam. A portion of the molten plastic is literally vaporized creating a pre-weakened score line. Some of the molten plastic in the pre-weakened line remains briefly molten until it re-solidifies. The drawback to this method occurs when the solidifying plastic in essence shrinks, causing stress that can result in a witness mark on the exterior (visible) surface of the skin when it is removed from the fixture.

It would therefore be desirable to form a true seamless air bag deployment skin, one which does not have a detectable witness mark. The present invention achieves this goal.

SUMMARY OF THE INVENTION

One aspect of the invention provides an apparatus for reducing skin distortions in laser scored skins. The apparatus includes a plate, in one aspect a vacuum plate, for supporting a skin to be scored and a laser mounted above the plate. The plate has a ridge portion which extends slightly above the principal surface of the plate. The ridge is configured to lift a region of the skin immediately beneath the line to be laser scored. The apparatus further includes means for providing relative movement between the laser beam and the plate.

In its broadest aspect the apparatus of the present invention includes a plate having a principal surface for receiving a layer of material, the plate having a ridge on its principal surface; a heat source which melts a portion of a thermoplastic skin on the plate; and means for producing relative movement between the heat source and the principal surface of the plate such that a score line of a predetermined depth is formed in the skin along the ridge.

DETAILED DESCRIPTION OF THE PREFERRED EMBODIMENTS

Figure 1:
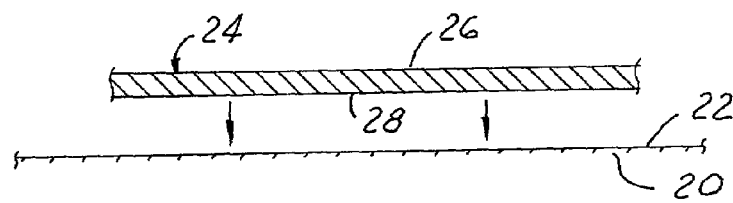
FIG. 1 illustrates in cross section a skin being placed on a plate in accordance with the prior art.
Figure 2:
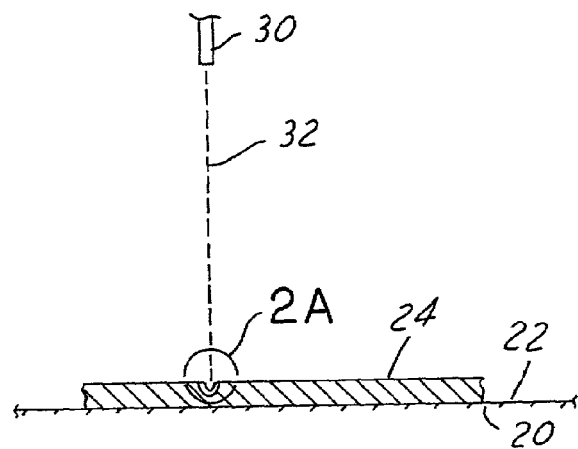
FIG. 2 illustrates a skin mounted on a plate for laser scoring and a score line being formed.
Figure 2A:
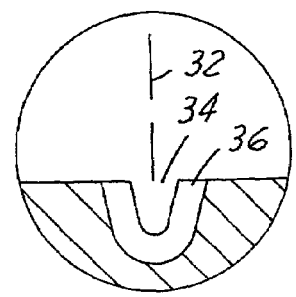
Figure 3:
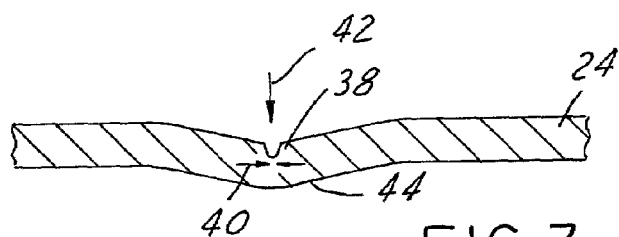
FIG. 3 depicts a skin in cross section formed by the prior art process, illustrating the formation of a witness mark

Referring now to FIGS. 1–3, the prior art process of laser scoring thermoplastic skins will be described. In FIG. 1, vacuum plate or fixture 20 is shown which has a plurality of holes (not shown) through which a vacuum is drawn at principal surface 22. Skin 24 having a back or interior surface 26 and an exterior or "show surface" 28 is placed on vacuum plate 20 as best shown in FIG. 2. It will be noted that in the prior art principal surface 22 of plate 20 is uniformly planar or flat. Skin 24 is drawn down and secured in place on plate 20 by a vacuum. Laser 30 is shown positioned above interior surface of skin 24. Relative movement of laser beam 32 and skin 24 causes beam 32 to melt (score)

skin 24 along a predetermined path to pre-weaken skin 24 for air bag release. This score line is shown as line 34. Thus, the heat of the laser beam produces pre-weakened line 34. The skin immediately surrounding pre-weakened line 34 is also melted by the heat of laser 32 producing molten skin region 36.

Referring now to FIG. 3 of the drawings, skin 24 is shown after it has been scored and removed from plate 20. Molten skin region 36 has re-solidified at region 38 producing shrinkage forces (illustrated by arrows 40) which in turn produce a hinging effect of skin 24 in the direction of arrow 42. This re-solidification and the hinging it produces results in witness mark 44 which is simply a visible mark on show surface 28 opposite pre-weakened line 34. As stated earlier, this witness mark generally outlines the air bag score line and is aesthetically undesirable.

Figure 4:
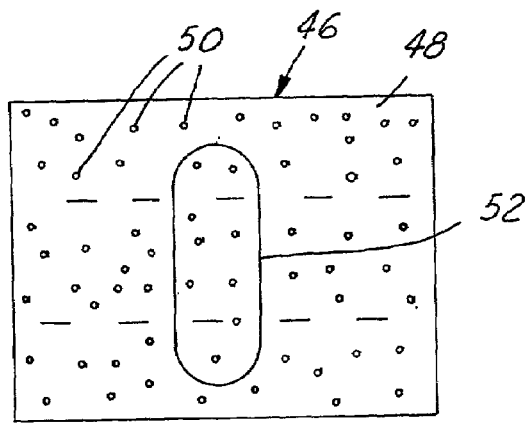
FIG. 4 is a plan view of a vacuum plate made in accordance with the present invention with a ridge in the shape of an air bag deployment opening.
Figure 5:
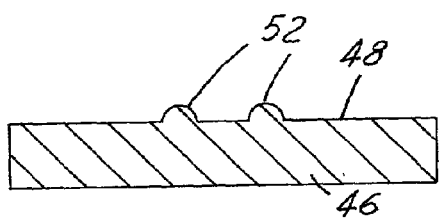
FIG. 5 is a cross section of the plate depicted in FIG. 4 along line 5—5.

Turning now to FIGS. 4–9 of the drawings the present invention will be described. In FIG. 4 plate or fixture 46 is shown generally having principal surface 48 in which a plurality of vacuum holes are seen such that plate 64 is in the nature of a vacuum plate. It is to be understood that while holes 50 are preferred, other means for securing skins to principal surface 48 may be suitable. Plate 46 will typically be formed of metal such as steel but other materials such as composites maybe suitable in some applications. The key to the present invention is laser ridge or boss 52. As best shown in FIG. 5, ridge 52 in this embodiment is an integral portion of plate 46. Ridge 52, as will he explained more fully hereinafter serves to raise the skin just in that region which will be laser scored. Thus, ridge 52 is a projection which extends slightly above principal surface 48 of plate 46. As seen in FIG. 4, laser ridge 52 is formed in the shape of the desired air bag pre-weakened line and will typically be spaced inwardly from the edge of plate 46. Although shown as an integral part of plate 46 in the drawings, it may be preferable to form ridge 52 as a discrete piece which is then attached, for example by welding, glueing or otherwise securing, for example a wire, to plate 46. The relative height of ridge 52 above principal surface (fixture surface) 48 will vary somewhat depending upon the specific application, but will typically be from about 0.05 mm to about 1.5 mm above principal surface (fixture surface) 48. It may be desirable in some applications to also include vacuum boles 50 in ridge 52.

Figure 6:
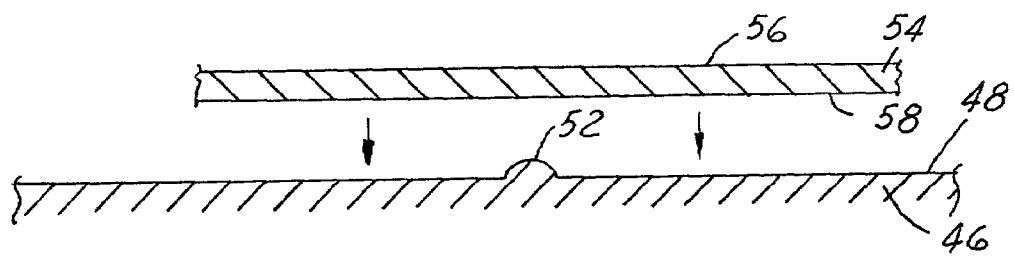
FIG. 6 is a diagrammatic view in cross section of skin being placed on the plate depicted in FIGS. 4 and 5, in fragmentary view.
Figure 7:
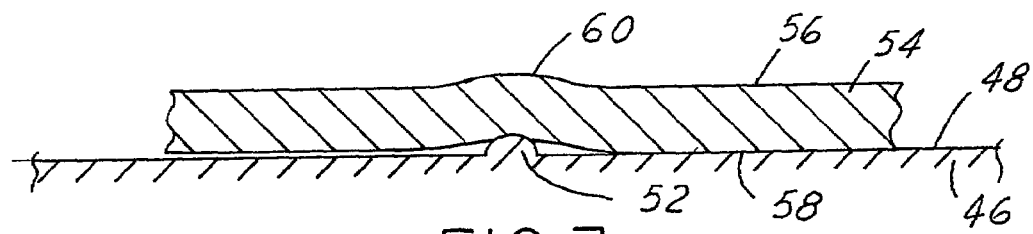
FIG. 7 is a diagrammatic view in cross section of a skin secured on a vacuum plate, a portion of the skin being raised by a plate ridge.

Referring now to FIGS. 6–9 of the drawings, in the process of the present invention, skin 56 is placed on principal surface 48 of plate 46 as shown in FIGS. 6 and 7. Skin 56 can be made of any number of materials but will typically be a thermoplastic and more specifically a TPO (thermoplastic olefin). As shown best in FIG. 7, skin 54 is raised where it contacts ridge 52 (only one of which is illustrated in the remaining drawings for simplicity). This forms an arc or bulge in skin 54 immediately above ridge 52. This raised portion of skin 54 is referred to herein as ridge induced twist 60. It should also be noted that the width of ridge 52 may vary as will its height, but in most applications ridge 52 will have a width of about 0.05 mm to about 1.5 mm.

Figure 8:
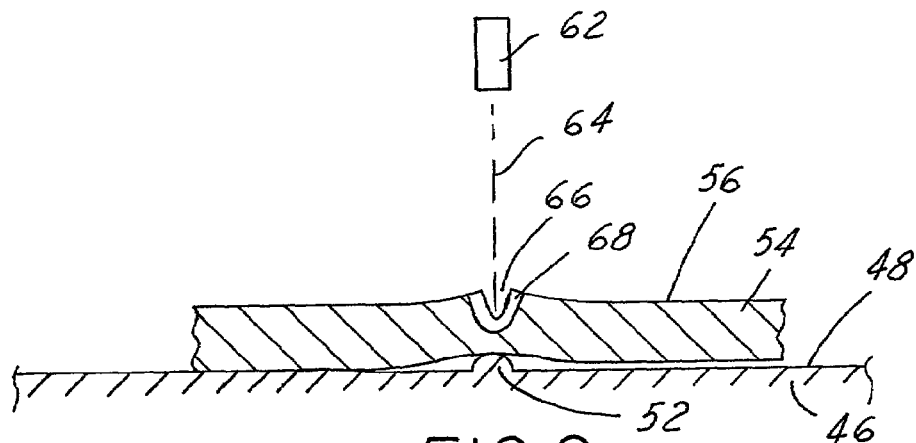
FIG. 8 is a diagrammatic view in cross section of the laser scoring of the assembly depicted in FIG. 7.
Figure 9:
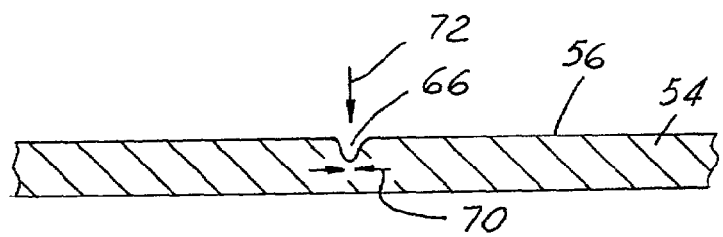
FIG. 9 is a cross section of a skin made in accordance with the present invention having no visible witness mark.

Referring now to FIG. 8 of the drawings, laser 62 emits laser beam 64 which impinges on skin 54 immediately above ridge 52, i.e. at ridge induced twist 60, to form a score line 66. Score line 66 has a depth of about 10% to about 90% of the thickness of skin 52. Relative movement of the skin and laser is carried out by microprocessor control. A portion of skin 52 melts, forming molten region 68. Laser beam 64 may be continuous or pulsed. It is to be understood that the specific geometry of the score line may vary: it may be continuous or interrupted, or may constitute a series of peaks and valleys created by one or more passes of the laser. Referring now to FIG. 9 of the drawings, the re-solidification of molten region 68 produces stress in the direction of arrows 70 and a hinging force (illustrated as arrow 72); however, (while not wishing to be limited by theory) the hinging force is counter-balanced by ridge twist 60 such that no witness mark is formed. In addition to producing a skin which does not have a witness mark on the show surface, this technique allows a deeper score line to be formed (i.e., the pre-weakened line does not have to be made shallow to reduce the appearance of the witness mark) so the skin provides even less resistance during air bag deployment.

While particular embodiments of this invention are shown and described herein, it will be understood, of course, that the invention is not to be limited thereto since many modifications may be made, particularly by those skilled in this art, in light of this disclosure. It is contemplated, therefore, by the appended claims, to cover any such modifications as fall within the true spirit and scope of this invention.

We claim:

1. An apparatus for creating a seamless air bag door cover, comprising:
   a plate having a principal surface for receiving a layer of material;
   said plate having a ridge on said principal surface, said ridge being spaced inwardly from edges of said plate and including a height and layout for raising a portion of the layer of material by said height along said layout of said ridge;
   a laser for emitting a laser beam toward said principal surface such that said laser beam impinges upon the layer of material on said principal surface; and
   means for producing relative movement between said laser beam and said principal surface such that said laser beam progressively impinges upon the layer of material on said principal surface along said ridge layout while said portion of said layer of material is raised by said ridge.

2. The apparatus for creating a seamless air bag door cover recited in claim 1, wherein said plate is a vacuum plate.

3. The apparatus for creating a seamless air bag door cover recited in claim 1, wherein said ridge is an integral portion of said plate.

4. The apparatus for creating a seamless air bag door cover recited in claim 1, further comprising a microprocessor for guiding the relative movement of said laser beam and said plate.

5. The apparatus for creating a seamless air bag door cover recited in claim 1, wherein said ridge comprises a wire secured to said plate.

6. An apparatus for creating a seamless air bag door cover, comprising:
   a plate having a principal surface for receiving a layer of material;
   said plate having a ridge on said principal surface, said ridge being spaced inwardly from edges of said plate and including a height and an upper surface configured to raise a portion of the layer of material by said height along a layout of said ridge;
   a laser for emitting a laser beam toward said principal surface such that said laser beam impinges upon the layer of material on said principal surface; and
   means for producing relative movement between said laser beam and said principal surface such that said laser beam progressively impinges upon the layer of material on said principal surface along said ridge layout while said portion of said layer of material is raised by said ridge.

7. The apparatus for creating a seamless air bag door cover recited in claim 6, wherein said plate is a vacuum plate.

8. The apparatus for creating a seamless air bag door cover recited in claim 6, wherein said ridge is an integral portion of said plate.

9. The apparatus for creating a seamless air bag door cover recited in claim 6, further comprising a microprocessor for guiding the relative movement of said laser beam and said plate.

10. The apparatus for creating a seamless air bag door cover recited in claim 6, wherein said ridge comprises a wire secured to said plate.

* * * * *